United States Patent
Tschirhart

(10) Patent No.: US 11,233,728 B2
(45) Date of Patent: Jan. 25, 2022

(54) CARRIER IDENTIFICATION CODE DELIVERY TO AN EGRESS NETWORK OF A TELECOMMUNICATIONS NETWORK

(71) Applicant: Level 3 Communications, LLC, Broomfield, CO (US)

(72) Inventor: David A. Tschirhart, Dale, TX (US)

(73) Assignee: Level 3 Communications, LLC, Broomfield, CO (US)

( * ) Notice: Subject to any disclaimer, the term of this patent is extended or adjusted under 35 U.S.C. 154(b) by 87 days.

(21) Appl. No.: 15/385,635

(22) Filed: Dec. 20, 2016

(65) Prior Publication Data
US 2018/0123949 A1     May 3, 2018

Related U.S. Application Data

(60) Provisional application No. 62/414,442, filed on Oct. 28, 2016.

(51) Int. Cl.
| | |
|---|---|
| *H04J 3/00* | (2006.01) |
| *H04L 12/709* | (2013.01) |
| *H04L 29/06* | (2006.01) |
| *H04L 29/12* | (2006.01) |

(52) U.S. Cl.
CPC .............. *H04L 45/245* (2013.01); *H04J 3/00* (2013.01); *H04L 61/3085* (2013.01); *H04L 65/1006* (2013.01); *H04L 65/1026* (2013.01); *H04L 65/1069* (2013.01); *H04L 69/22* (2013.01)

(58) Field of Classification Search
CPC . H04L 41/0803; H04L 45/245; H04L 45/308; H04L 45/34; H04L 45/38; H04L 61/3085; H04L 63/10; H04L 65/1006; H04L 65/1069; H04L 69/22; H04J 3/00
See application file for complete search history.

(56) References Cited

U.S. PATENT DOCUMENTS

| | | | | |
|---|---|---|---|---|
| 6,137,874 A * | 10/2000 | Brown | ............... | H04M 3/4228 379/207.02 |
| 7,113,581 B2 * | 9/2006 | Benedyk | ............... | H04M 7/125 370/225 |
| 7,274,784 B2 * | 9/2007 | Bedingfield, Sr | ... | H04Q 3/0029 379/219 |

(Continued)

OTHER PUBLICATIONS

International Search Report dated Mar. 3, 2017, Int'l Appl. No. PCT/US16/067870, Int'l Filing Date Dec. 20, 2016; 3 pgs.

(Continued)

*Primary Examiner* — Alpus Hsu

(57) ABSTRACT

Aspects of the present disclosure involve systems, methods, computer program products, and the like, for utilizing a CIC value field in signaling information of a communication to provide an identification of the ingress network to an egress or receiving network of a long distance telecommunications network. The system and method provides for the provisioning of a signaling CIC for an ingress trunkgroup or network to a telecommunications network for downstream signaling purposes by overriding a received CIC value with a provisioned CIC value specific to the ingress network. This provisioned CIC value identifies the ingress network to the long distance network to the egress network for use by the egress network.

20 Claims, 5 Drawing Sheets

(56) References Cited

U.S. PATENT DOCUMENTS

| | | | | |
|---|---|---|---|---|
| 7,283,516 | B1* | 10/2007 | Ganesan | H04L 12/66 370/352 |
| 7,639,664 | B2* | 12/2009 | Clark | H04L 41/0816 370/352 |
| 7,764,955 | B1* | 7/2010 | Mangai | H04M 3/42306 370/396 |
| 8,165,113 | B1* | 4/2012 | Peters, Jr | H04L 65/1006 370/389 |
| 8,249,241 | B1* | 8/2012 | Schaff | H04L 65/1053 379/221.02 |
| 8,401,166 | B1* | 3/2013 | Kell | H04M 3/42238 370/352 |
| 8,675,851 | B1* | 3/2014 | Karp | H04M 7/0075 379/201.01 |
| 9,065,837 | B2* | 6/2015 | Noldus | H04L 65/1069 |
| 9,247,043 | B1* | 1/2016 | Schaff | H04M 3/42306 |
| 9,479,649 | B2* | 10/2016 | Overton | H04L 65/1043 |
| 2005/0084090 | A1 | 4/2005 | Moisey et al. | |
| 2005/0207435 | A1 | 9/2005 | Christie et al. | |
| 2007/0297595 | A1* | 12/2007 | Bedingfield | H04Q 3/0029 379/221.02 |
| 2008/0049738 | A1* | 2/2008 | Joung | H04L 41/046 370/356 |
| 2009/0041223 | A1* | 2/2009 | Agarwal | H04M 3/42297 379/211.02 |
| 2011/0164534 | A1* | 7/2011 | Vaishnavi | H04L 29/06027 370/259 |
| 2013/0177014 | A1 | 7/2013 | Kell | |
| 2013/0294439 | A1 | 11/2013 | Lewis | |

OTHER PUBLICATIONS

Written Opinion of the International Searching Authority dated Mar. 3, 2017, Int'l Appl. No. PCT/US16/067870, Int'l Filing Date Dec. 20, 2016; 6 pgs.

International Preliminary Report on Patentability, dated Apr. 30, 2019, Int'l Appl. No. PCT/US16/067870, Int'l Filing Date Dec. 20, 2016; 8 pgs.

* cited by examiner

CARRIER IDENTIFICATION CODE DELIVERY TO AN EGRESS NETWORK OF A TELECOMMUNICATIONS NETWORK

CROSS-REFERENCE TO RELATED APPLICATIONS

This application is related to and claims priority under 35 U.S.C. § 119(e) from U.S. Patent Application No. 62/414,442, filed Oct. 28, 2016, titled "CARRIER IDENTIFICATION CODE DELIVERY TO AN EGRESS NETWORK OF A TELECOMMUNICATIONS NETWORK," the entire content of which is incorporated herein by reference for all purposes.

TECHNICAL FIELD

Aspects of the present disclosure generally relate to systems and methods for implementing a telecommunications network, and more specifically for provisioning and delivering an ingress-specific carrier identification code to an egress network in communication with a telecommunications network.

BACKGROUND

Telecommunication networks provide for the transmission of information across some distance through terrestrial, wireless or satellite communication networks. Such communications may involve voice, data or multimedia information, among others. Often, communications transmitted over the network include identifying information or codes included in a header or other portion of the communication that the network uses to route to a destination network or device. In some instances, such identifying information may also be used for billing purposes by tracking the origination and destination of communications through the network. However, it is often the case that some information is utilized to route or signal during a portion of the transmission between communicating devices, but becomes unnecessary for routing during other portions of the transmission. For example, a particular address may identify an ingress device to a network, but such information may become obsolete once the communication reaches the network. However, the routing information may be retained within a portion of the communication throughout the entire transmission, even though such information is only utilized at the beginning portion of the routing of the communication. Carrier Identification Codes (CIC) are one such example of routing information included in a packet or communication that is utilized by only a portion of the transmission. However, this information is typically not used for any downstream signaling purposes but is rather ignored once the communication is received at the ingress device to the network.

In other examples, the CIC of a communication may be discarded by one or more of the devices along the communication path once the information is no longer needed by the devices. However, such routing information may provide downstream devices with additional information on the originating network or devices along the communication path. Regardless of if the CIC is retained or discarded, such information is typically not utilized by downstream devices of the communication path once utilized to ingress into a long distance network.

SUMMARY

One implementation of the present disclosure may take the form of a method for routing a communication in a telecommunications network. The method may include the operations of receiving a communication from an ingress network to a telecommunications network, the communication comprising a upstream carrier identification code (CIC) value associated with an upstream network, removing the upstream CIC value from the communication, inserting a provisioned ingress network specific CIC value into a signaling information of the communication, and transmitting the communication to an egress network of the telecommunications network with the provisioned ingress network specific CIC value in the signaling information of the communication.

Another implementation of the present disclosure may take the form of a networking device. The device may include at least one communication port for receiving a communication from an ingress network to a telecommunications network, the communication comprising an upstream carrier identification code (CIC) value associated with an upstream network, a processing device, and a computer-readable medium connected to the processing device configured to store information and instructions. When the processing device executes the instructions, the device inserts a provisioned ingress network specific CIC value into signaling information of the communication and transmits the communication to an egress network of the telecommunications network with the provisioned ingress network specific CIC value in the signaling information of the communication.

Yet another implementation of the present disclosure may take the form of a telecommunications network. The network may include an ingress device receiving a communication from an ingress network to a telecommunications network, the communication comprising an upstream carrier identification code (CIC) value associated with an upstream network and routing engine in communication with the ingress device providing egress network identification for the received communication. The ingress device removes the upstream CIC value from the communication, inserts a provisioned ingress network specific CIC value into signaling information of the communication, and transmits the communication to the egress network based at least on the received egress network identification with the provisioned ingress network specific CIC value in the signaling information of the communication.

DETAILED DESCRIPTION

Figure 1:
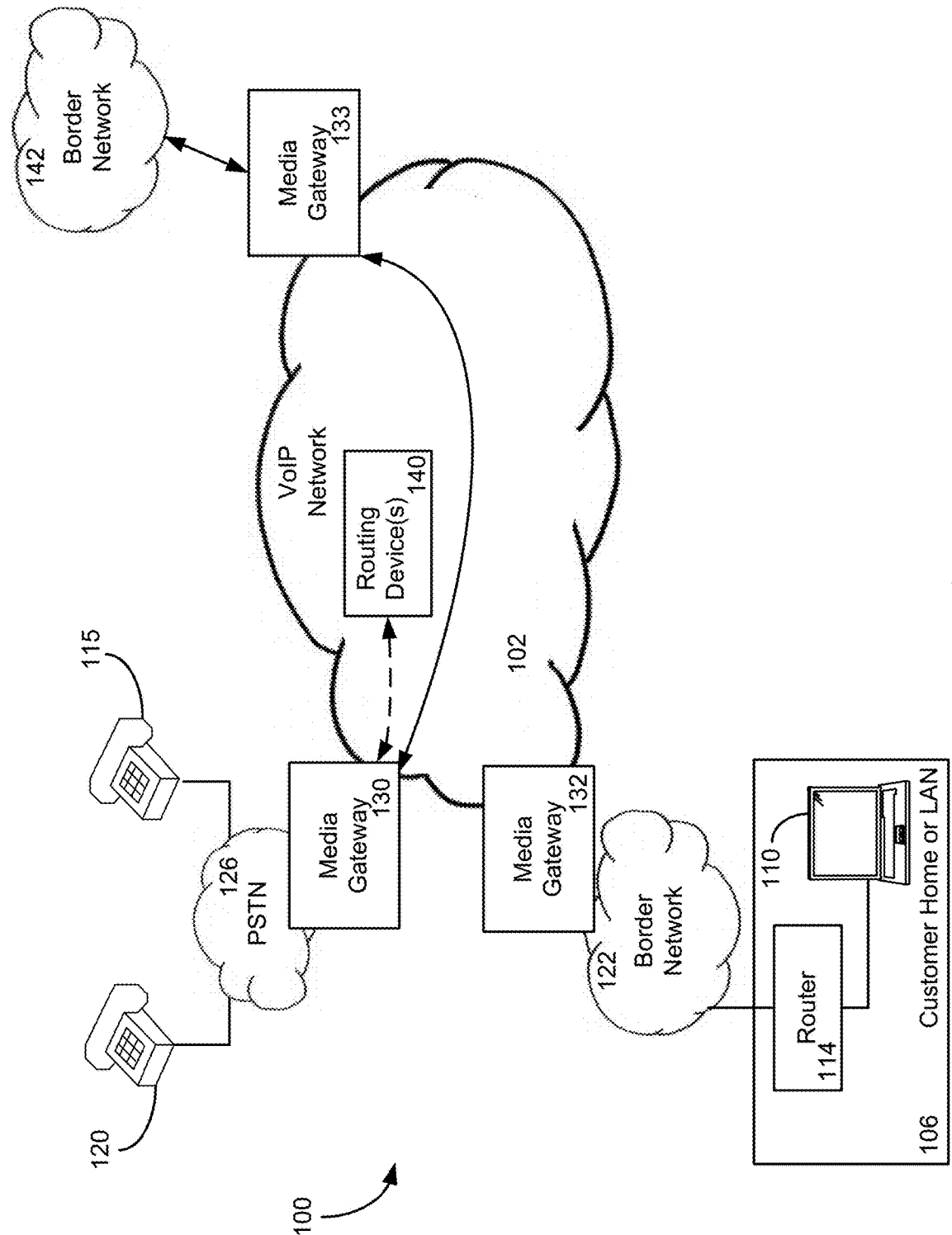
FIG. 1 schematic diagram illustrating an exemplary Internet Protocol (IP) operating environment in accordance with one embodiment.

Aspects of the present disclosure involve systems, methods, computer program products, and the like, for provisioning and delivering a provisioned carrier identification code (CIC) to an egress network in communication with a telecommunications network. In particular, a telecommunications network may receive a long-distance communication (or any other type of communication) for transmission through the network to a destination network or device. The communication may include some signaling information in a header or otherwise associated with the communication, such as a CIC that identifies an originating network. In some instances, the header may not include a CIC but may still have capability to carry a CIC value through the transmission path. Regardless of whether the CIC is included in the communication, the CIC value is generally not utilized downstream to route the communication as the CIC identifies an ingress network to the long distance network and is used to route the communication during the ingress portion of the communication path.

However, information concerning the networks utilized at the originating portion of the transmission path may be useful to networks at the terminating portion of the transmission. For example, a terminating network may bill an originating network for terminating or connecting the long distance communication. To facilitate this billing purpose, a network may generate a Call Detail Record (CDR) for each received communication that identifies the ingress network to the network (among other information). The CDR may then be provided to the egress or terminating network for billing by the egress network. In general, the egress network may utilize the information in the CDR for any reason. However, the CDR for communications through the network may not be provided to the egress network for some time after the communication, such as on a daily or monthly basis. Thus, many egress networks may prefer to receive an identification of the ingress network to the network with the provided communication to improve the billing procedures of the connecting network.

Provided herein is a method and/or network system for provisioning a signaling CIC value against an ingress trunkgroup to a long distance telecommunications network, overriding or stripping any received CIC values from the trunkgroup, and delivering the provisioned CIC value to an egress or co-provider customer network at the egress side of the call. Through this method, the CIC value included in the communication identifies the ingress network to the network for use by the egress network, such as for one or more billing purposes. The provisioning of the CIC value for an ingress trunkgroup may be used for both the traditional Time-Division Multiplex (TDM) based networks and devices as well as the Internet Protocol (IP) based networks and devices. In particular, the CIC value identifying the ingress trunkgroup may be included in the Carrier Identification Parameter (CIP) field for signaling in TDM networks and in the Request URI Header for signaling in IP based networks. The CIC value included in the header or signaling of the communication may then be utilized by the egress or destination network as desired by administrators of the egress network. In this manner, the egress network to the network does not need to wait for the CDR to obtain certain information about the long distance communication, but rather receives such information at the time the communication request is received.

Beginning in FIG. 1, an exemplary operating environment 100 that may utilize the CIC delivery mechanism is described. In general, the environment 100 provides for establishing communication sessions between network users and for providing one or more network services to network users. For example, users to the network 100 may communicate with each other through communication devices, including voice communications and video communications. With specific reference to FIG. 1, the environment 100 includes an IP network 102, which may be provided by a wholesale network service provider. However, while the environment 100 of FIG. 1 shows a configuration using the IP network 102; it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The IP network 102 includes numerous components such as, but not limited to gateways, routers, and registrars, which enable communication and/or provides services across the IP network 102, but are not shown or described in detail here because those skilled in the art will readily understand these components. In some instances, those communications may be exchanged across the network 102 over long distances. More relevant to this description is the interaction and communication between the IP network 102 and other entities, such as the one or more customer home or business local area networks (LANs) 106, where a user of the network will connect with the network.

Customer network 106 can include communication devices such as, but not limited to, a personal computer or a telephone 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the IP network 102 to other communication devices, such as another customer network 126 and/or the Internet 142. Components of the customer network 106 are typically home- or business-based, but they can be relocated and may be designed for easy portability. For example, the communication device 110 may be wireless (e.g., cellular) telephone, smart phone, tablet or portable laptop computer. In some embodiments, multiple communication devices in diverse locations that are owned or operated by a particular entity or customer may be connected through the IP network 102.

The customer network 106 typically connects to the IP network 102 via a border network 122, such as one provided by an Internet Service Provider (ISP). The border network 122 is typically provided and maintained by a business or organization such as a local telephone company or cable company. The border network 122 may provide network/communication-related services to their customers. In addition, the communication device 120 accesses, and is accessed by, the IP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the IP Network 102 through a media gateway device 130 or provider edge 132, 131. For ease of instruction, only three communication devices 110, 115, 120 are shown communicating with the IP network 102; however, numerous such devices, and other devices, may be connected with the network, which is equipped to handle enormous numbers of simultaneous calls and/or other IP-based communications.

In many IP networks 102, communications through the network are routed based on a SIP URI. For example, a user to the network 102 may utilize a communications device (such as a telephone) to dial a telephone number (TN) for the destination communication device. The user's device or other component within the network environment 100 converts the TN into a SIP URI associated with the destination communication device. The SIP URI is then utilized by the network 102 to route the communication through the network to the destination device associated with the dialed TN. In other examples, communications may be routed through the network 102 based on an SS7 signaling protocol.

Long distance communications may be transmitted across the IP network 102 between two communication devices. For example, a user to the network 102 may utilize a communications device (such as telephone 120) to dial a telephone number (TN) for a destination communication device, perhaps one reachable through border network 142. The communication is transmitted through the PTSN 126 network to the media gateway 130. The media gateway 130, in turn, provides routing information included in the communication to a routing device 140 included in the network 102. The routing device 140 utilizes the routing information to determine an egress network from the IP network 102 and provides terminating information to the media gateway 130. The media gateway 130 then routes the communication through the network 102 to an egress gateway (such as media gateway 133) associated with the egress network. The media gateway 133 provides the communication to the border egress network 142 for termination at the destination device. In this manner, communications may be transmitted through the network 102 from an originating device to a terminating device.

Figure 2:
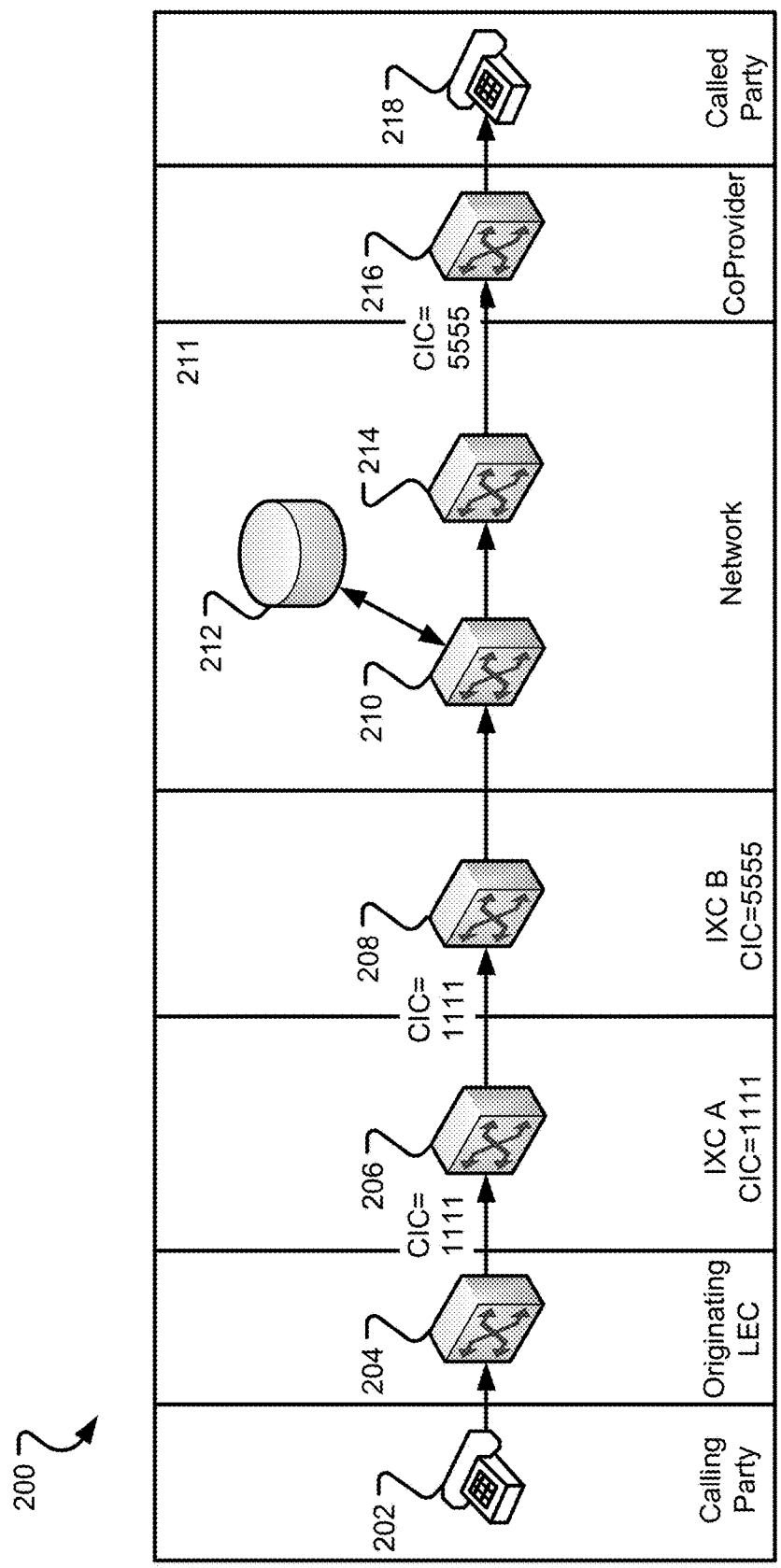
FIG. 2 is a first schematic call-flow diagram illustrating providing a carrier identification code (CIC) to a co-provider network for inbound long distance communications.

FIG. 2 illustrates a more detailed call-flow diagram 200 for two devices to communicate over a long distance or other type of telecommunications network. As described above, a user may utilize a telephone 202 or other communication device to initiate a call or communication. The communication is routed to an originating LEC 204. The LEC 204 may utilize a database to determine which inter-exchange carrier (IXC) the communication should be routed. In particular, the database includes a CIC value associated with the calling party 202 and returns the associated CIC to the LEC 204 for routing of the communication. With the CIC now known, the LEC 204 routes the communication to the IXC A identified by the CIC. In the example shown, the CIC returned by the database is value "1111", which identifies IXC A 206. The LEC 204 appends the returned CIC value to the communication and routes the communication to the identified IXC A 206. It should be appreciated that the CIC may identify any IXC connected to the LEC for routing to the destination.

Upon receiving the communication, IXC A 206 routes the communication to another IXC, identified in the diagram 200 as IXC B 208. In some instances, however, the IXC A 206 may route the communication directly to network 211. IXC B 208 is included in the diagram 200 to illustrate that any number of inter-exchange carriers may be utilized to route a communication to an end device. Further, each IXC may be identifiable through a unique CIC value. For IXC B 208, CIC value "5555" identifies the carrier. However, IXC A 206 does not use a CIC value to route the communication to IXC B 208. Rather, IXC A 206 may utilize other routing techniques to route the communication to IXC B 208 and, eventually, to network 211. Thus, the CIC value is typically only utilized during the routing of the communication from the originating LEC 204 to IXC A 206. In some instance, the CIC value "1111" may remain appended to the communication even after routing to the IXC A 206 has occurred. In other instances, the CIC value may be removed from the communication by IXC A 206, IXC B 208, or network 211.

The association of the CIC value with a communication identifying the IXC A 206 may occur for both TDM-based networks and IP-based networks. For example, in TDM-based networks, the CIC value may be inserted into the Signaling System No. 7 (SS7) signaling protocol by the LEC 204 to identify IXC A 206 as the interexchange network to route the communication. In particular, the SS7 ISUP IAM message may include a CIP parameter with the CIC value. For IP-based networks, the CIC value may be included in a SIP INVITE message, such as in a Request URI message. However, it should be appreciated that the CIC value may be included in any header or packet of a communication for routing the communication to a particular destination or intermediate network device.

Once received at IXC B 208, the communication may then be routed to network 211, and in particular an ingress gateway 210 of the network. As explained above, the ingress gateway 210 may contact one or more routing devices 212 to discern the egress network (and an associated routing path through the network) to which the communication should be routed. Based on the identification of the egress network 216, the network 211 may route the communication to an egress gateway device 214. The egress gateway device 214 provides the communication to the egress network or co-provider network 216 and the co-provider network terminates the communication at the destination device 218. Once established, the parties may communicate over the connection illustrated in FIG. 2.

Figure 3:
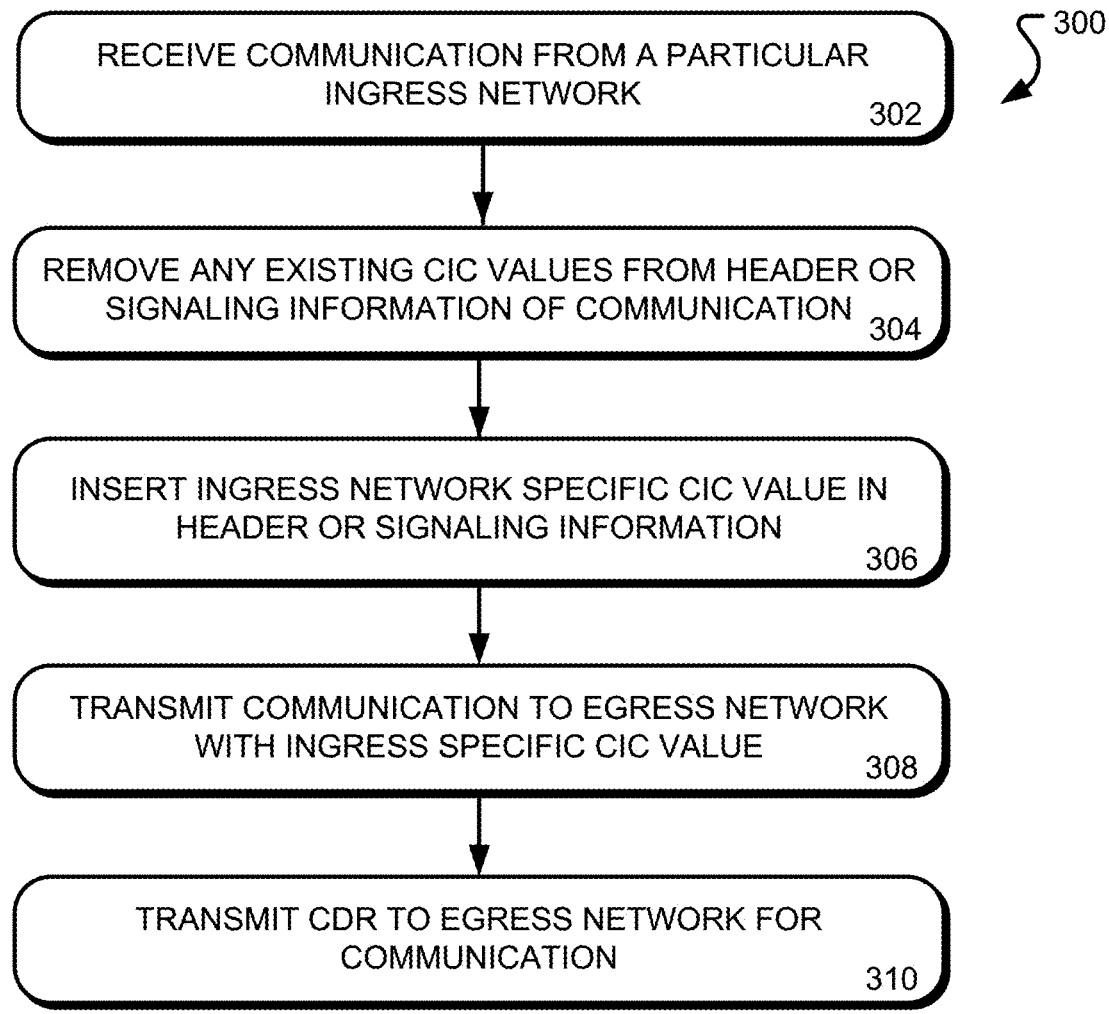
FIG. 3 is a flowchart illustrating a method for delivering a CIC value identifying an ingress network of an inbound long distance communication to an egress network.

As mentioned above, the egress network 216 or destination LEC may bill the ingress network 208 to network 211 for the use of their network. In particular, network 211 may provide the egress network 216 with a CDR that includes an identification of the ingress network 208 such that the egress network may bill the ingress network for the use of their network. However, this CDR may not be provided for some time after the communication is provided by the network 211. Thus, in some embodiments, network 211 may provide an identification of the ingress network 208 to the egress network 216 as a CIC value included with the communication, such as in the SIP request URI or the SS7 ISUP IAM message associated with the communication. In particular, FIG. 3 is a flowchart illustrating a method 300 for delivering a CIC value identifying an ingress network of an inbound long distance communication to an egress network. The operations of the method 300 may be performed by any component or device of a telecommunications network, such as the ingress gateway 210 to network 211. In another embodiment, the operations of the method 300 are performed by multiple networking devices of the network.

Beginning in operation 302, the network 211 receives a communication from an ingress network. In one example, the communication is a long distance communication intended for a destination device in communication with the network through one or more co-provider networks or egress networks 216. In general, each IXC connected to network 211 may be designated as a particular trunkgroup. In other words, each IXC may have a dedicated trunk of communication lines that connect to the network 211. In this manner, the network 211 may determine which IXC connected to the network 211 provides a particular communication to the network based on the trunk utilized to transmit the communication to the network. Further, the network 211 may assign a particular identifier to the ingress trunkgroups connected to the network. In one particular embodiment, the trunkgroup identifier may be a provisioned CIC value. In the example illustrated in FIG. 2, the IXC B 208 connected to the network 211 through a particular trunk connection is identifiable through the provisioned CIC value "5555". Generally, CIC values are utilized to identify a downstream IXC to which the communication is intended to be sent. However, through the method 300 discussed herein, the CIC value may be utilized to identify an originating IXC or network (or upstream network) to network 211. Thus, the CIC value "5555" may be associated with a communication received from IXC B 208 to identify that the communication is received from that particular IXC over a particular trunk connection.

Figure 4:
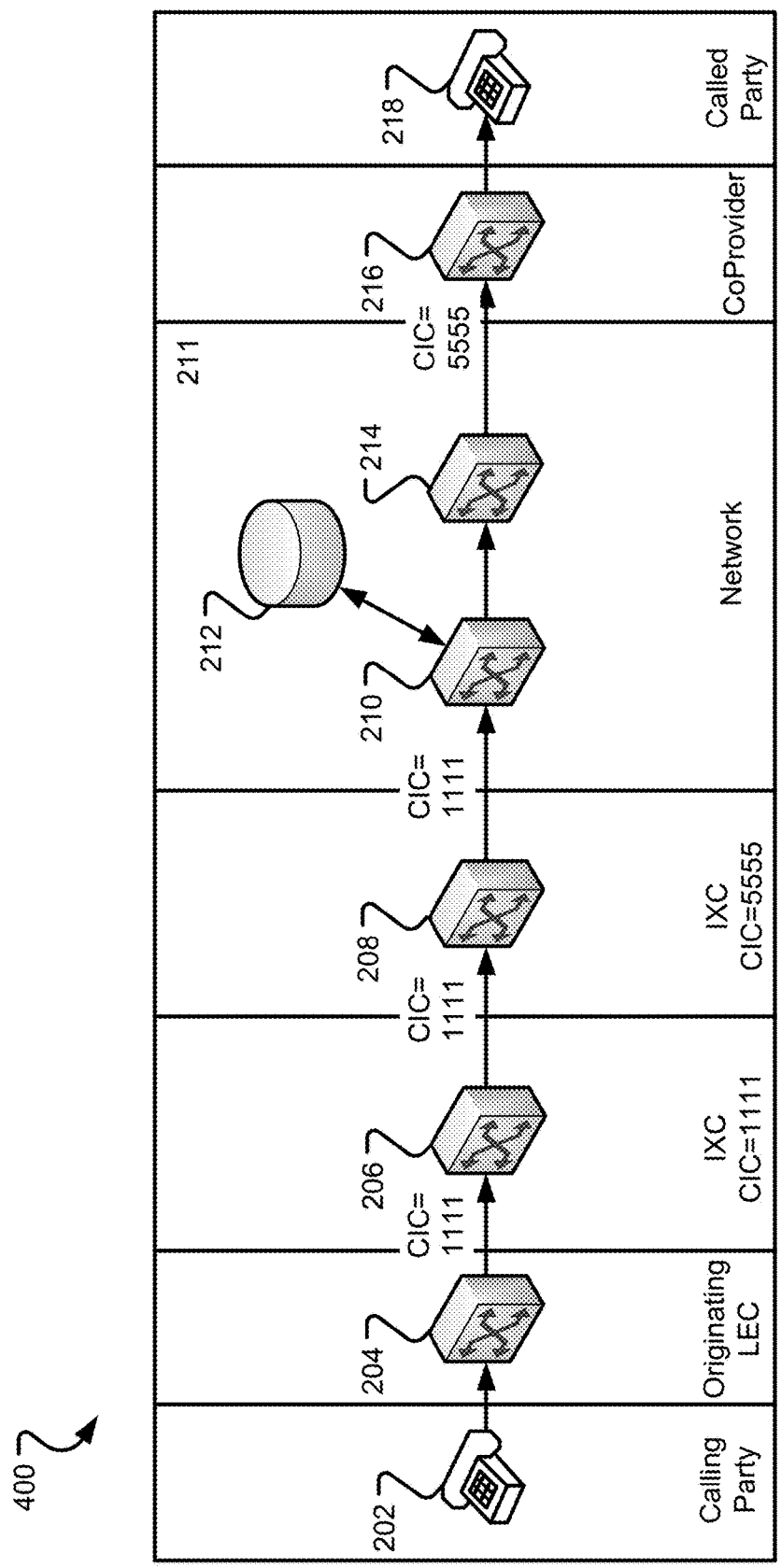
FIG. 4 is a second schematic call-flow diagram illustrating providing a CIC to a co-provider network for inbound long distance communications.

In some instances, the received communication from IXC A 208 includes the CIC value appended to the communication by the originating LEC 204 for routing to the IXC A 206. In other instances, the CIC value is stripped from the communication by one of the networks of the connection path prior to transmission to network 211. In the particular example illustrated in FIG. 2, IXC B 208 strips the CIC value from the communication as the CIC value is no longer needed to route the communication. In an alternative example, the CIC value remains in the signaling information for the communication. In particular, FIG. 4 is a second schematic call-flow diagram illustrating providing a CIC to a co-provider network for inbound long distance communications. The components and call flow illustrated in FIG. 4 is the same as that illustrated in FIG. 2 and discussed above. However, in this example, the CIC value "1111" inserted into the signaling information by the originating LEC 204 to identify IXC A 206 is not removed from the signaling information prior to being transmitted to network 211. As such, the communication includes the CIC value for IXC A 206 when transmitted or routed to network 211.

Regardless of if the CIC value for a previous IXC network remains in the signaling information for the communication, the network 211 or ingress gateway 210 of the network may strip the CIC value from the communication in operation 304 of the method 300 of FIG. 3. For example, CIC value "1111" included in the communication as shown in the call flow 400 of FIG. 4 may be removed by the network 211. In those instances where the CIC value is already removed prior to transmission to the network 211, the network may ignore the stripping operation.

Once the CIC value is removed or determined to not be included in the communication, the network 211 may insert a trunk group or ingress network specific provisioned CIC value into the signaling information of the communication. For example, the network 211 may determine that the communication is received from ingress network IXC B 208 based on the trunk group through which the communication is received and/or the ingress gateway 210 that receives the communication. A provisioned CIC value is associated with the ingress network 208 by the network 211. In the example illustrated in FIGS. 2 and 4, the ingress network is provisioned a CIC value of "5555", although any CIC value may be used. With the ingress network identified, the network 211 may then insert the ingress network specific CIC value into the signaling information for the communication in operation 306. The insertion of the CIC value into the signaling information may be similar to that performed by the originating LEC 204. In other words, the ingress specific CIC value may be inserted into the SS7 ISUP message for TDM-based communications received at the network 211. More particularly, the network 211 may insert the ingress specific provisioned CIC value into the ISUP IAM message. Similarly, for IP-based communications, the ingress specific CIC value may be inserted into the Request URI portion of a SIP INVITE message by the network 211 or network device 210. In other signaling protocols, the ingress network specific CIC value may be inserted into the signaling information where a traditional CIC value is included in the signaling protocol.

Once the incoming message includes the ingress network CIC value, the network 211 may transmit the communication to the destination or egress network 216 in operation 308 for terminating by the egress network at the terminating device 218. The egress network 216 may then extract the ingress network CIC value from the signaling information and use that information for any number of reasons. For example, the egress network 216 may utilize the information to generate one or more billing invoices to the ingress network 208 for the use of their network. However, this is but one example and the information may be utilized by the egress network 216 for any reason. Further still, the network 211 may transmit a typical CDR about the communication to the egress network at a later time in operation 310. In some instances, however, the egress network 216 may opt to not receive the ingress specific CIC value in the communication such that the network 211 may remove the CIC value prior to transmission to the egress network. In this instance, the egress network 216t may utilize the CDR for billing of the ingress network 208.

Through the method 300 discussed above, the long distance network 211 may utilize the CIC value field in the signaling information of a communication to provide an identification of the ingress network 208 of the network to an egress or receiving network 216. Thus, rather than utilizing the CIC value of the signaling information as downstream routing information, the network 211 may leverage the CIC value to provide an identification of an upstream network. The method 300 provides for the provisioning of a signaling CIC for an ingress trunkgroup or network to a telecommunications network for downstream signaling purposes by overriding a received CIC value with a provisioned CIC value specific to the ingress network. This provisioned CIC value identifies the ingress network to network 211 to the egress network for use by the egress network.

Figure 5:
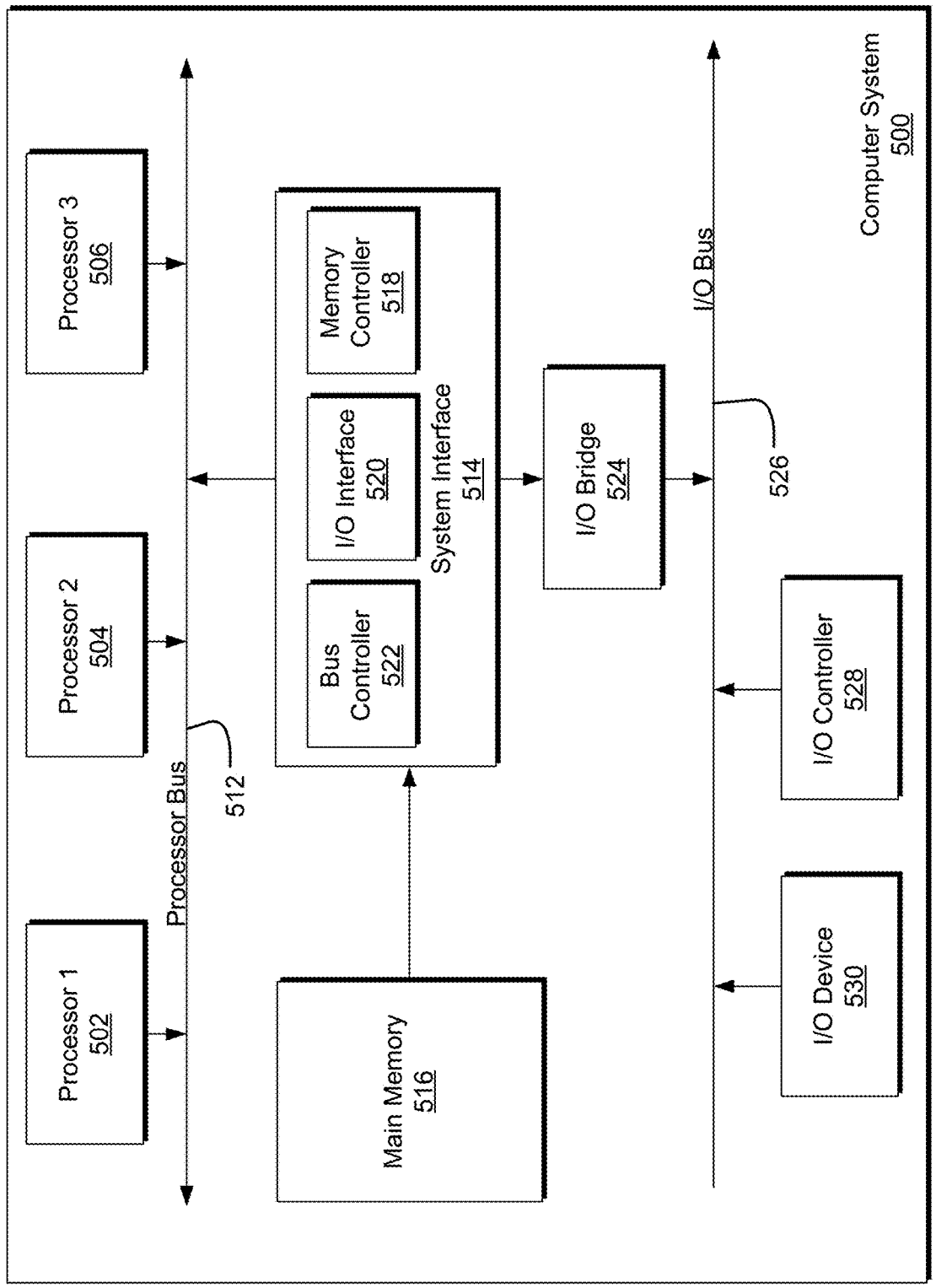
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be a computing device to manage the IP endpoint database 202 discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 540 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method for routing communication data in a telecommunications network, the method comprising:
   receiving the communication data from an ingress network to the telecommunications network, the communication data comprising an upstream carrier identification code (CIC) value associated with a calling party in an upstream network;
   removing the upstream CIC value from the communication data;
   inserting a provisioned ingress network specific CIC value into a signaling information included in the communication data, the provisioned ingress network specific CIC value different from the upstream CIC value, and the provisioned ingress network specific CIC value indicative of the ingress network from which the communications data were received; and
   transmitting the communication data including the provisioned ingress network specific CIC value in the signaling information to an egress network of the telecommunications network, wherein the provisioned ingress network specific CIC value identifies the ingress network to the telecommunications network for use by the egress network.

2. The method of claim 1 wherein the communication data comprises a time-division multiplex (TDM)-based networking communication data and the signaling information comprises a signaling system no. 7 integrated services digital network user part initial address message (SS7 ISUP IAM) message, the provisioned ingress network specific CIC value included in the SS7 ISUP IAM message.

3. The method of claim 2 wherein the signaling information further comprises a carrier identification parameter (CIP) field of the SS7 ISUP IAM message, the provisioned ingress network specific CIC value included in the CIP field.

4. The method of claim 1 wherein the communication data comprises Internet Protocol (IP)-based networking communication data and the signaling information comprises a Session Initiation Protocol (SIP) INVITE message, the provisioned ingress network specific CIC value included in the SIP INVITE message.

5. The method of claim 4 wherein the signaling information further comprises a request uniform resource indicator (R-URI) header of the SIP INVITE message, the provisioned ingress network specific CIC value included in the R-URI header.

6. The method of claim 1 further comprising:
   identifying the ingress network to the telecommunications network by receiving the communication data on a trunkgroup connection to the telecommunications network, the trunkgroup connection associated with the ingress network.

7. The method of claim 6 further comprising:
   provisioning the ingress network specific CIC value based on an identification of the ingress network associated with the trunkgroup connection, the ingress network specific CIC value unique to the trunkgroup connection.

8. A networking device comprising:
   a processing device; and a computer-readable medium connected to the processing device configured to store information and instructions that, when executed by the processing device, cause the processing device to perform operations of:
- identifying communication data received from an ingress network to a telecommunications network, the communication data comprising an upstream carrier identification code (CIC) value associated with a calling party in an upstream network;
- detecting the upstream CIC value of the communication data;
- removing the upstream CIC value from the communication data;
- inserting a provisioned ingress network specific CIC value into a signaling information included in the communication data, the provisioned ingress network specific CIC value different from the upstream CIC value, and the provisioned ingress network specific CIC value indicative of the ingress network from which the communications data were received; and
- transmitting the communication data including the provisioned ingress network specific CIC value in the signaling information to an egress network of the telecommunications network, wherein the provisioned ingress network specific CIC value identifies the ingress network to the telecommunications network for use by the egress network.

9. The networking device of claim 8 wherein the communication data comprises a time-division multiplex (TDM)-based networking communication data and the signaling information comprises a signaling system no. 7 integrated services digital network user part initial address message (SS7 ISUP IAM) message, the provisioned ingress network specific CIC value included in the SS7 ISUP IAM message.

10. The networking device of claim 9 wherein the signaling information further comprises a carrier identification parameter (CIP) field of the SS7 ISUP IAM message, the provisioned ingress network specific CIC value included in the CIP field.

11. The networking device of claim 8 wherein the communication data comprises an Internet Protocol (IP)-based networking communication data and the signaling information comprises a Session Initiation Protocol (SIP) INVITE message, the provisioned ingress network specific CIC value included in the SIP INVITE message.

12. The networking device of claim 11 wherein the signaling information further comprises a request uniform resource indicator (R-URI) header of the SIP INVITE message, the provisioned ingress network specific CIC value included in the R-URI header.

13. The networking device of claim 8 wherein the processing device further performs an operation of:
- identifying the ingress network to the telecommunications network by receiving the communication data on a trunkgroup connection to the telecommunications network, the trunkgroup connection associated with the ingress network.

14. The networking device of claim 13 wherein the processing device further performs an operation of:
- provisioning the ingress network specific CIC value based on an identification of the ingress network associated with the trunkgroup connection, the ingress network specific CIC value unique to the trunkgroup connection.

15. A telecommunications network comprising:
- an ingress device receiving communication data from an ingress network to the telecommunications network, the communication data comprising an upstream carrier identification code (CIC) value associated with a calling party in an upstream network; and
- a routing device communicatively coupled to the ingress device providing an egress network identification for the received communication data, wherein the ingress device:
- removes the upstream CIC value from the communication data;
- inserts a provisioned ingress network specific CIC value into a signaling information included in the communication data, the provisioned ingress network specific CIC value different from the upstream CIC value, and the provisioned ingress network specific CIC value indicative of the ingress network from which the communication data were received; and
- transmits the communication data including the provisioned ingress network specific CIC value in the signaling information to an egress network based at least on the egress network identification, wherein the provisioned ingress network specific CIC value identifies the ingress network to the telecommunications network for use by the egress network.

16. The telecommunications network of claim 15 wherein the communication data comprises a time-division multiplex (TDM)-based networking communication data and the signaling information comprises a signaling system no. 7 integrated services digital network user part initial address message (SS7 ISUP IAM) message, the provisioned ingress network specific CIC value included in the SS7 ISUP IAM message.

17. The telecommunications network of claim 16 wherein the signaling information further comprises a carrier identification parameter (CIP) field of the SS7 ISUP IAM message, the provisioned ingress network specific CIC value included in the CIP field.

18. The telecommunications network of claim 15 wherein the communication data comprises Internet Protocol (IP)-based networking communication data and the signaling information comprises a Session Initiation Protocol (SIP) INVITE message, the provisioned ingress network specific CIC value included in the SIP INVITE message.

19. The telecommunications network of claim 18 wherein the signaling information further comprises a request uniform resource indicator (R-URI) header of the SIP INVITE message, the provisioned ingress network specific CIC value included in the R-URI header.

20. The telecommunications network of claim 15, wherein the provisioned ingress network specific CIC value is unique to a trunkgroup connection to the telecommunications network, the trunkgroup connection associated with the ingress network.

* * * * *